(12) United States Patent
Stanley

(10) Patent No.: US 8,411,339 B2
(45) Date of Patent: *Apr. 2, 2013

(54) HOLOGRAPHIC IMAGING SYSTEMS WITH DC BALANCE

(75) Inventor: Maurice Stanley, Malvern (GB)

(73) Assignee: F. Poszat HU, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/303,514

(22) Filed: Nov. 23, 2011

(65) Prior Publication Data

US 2012/0069412 A1    Mar. 22, 2012

Related U.S. Application Data

(63) Continuation of application No. 12/026,492, filed on Feb. 5, 2008, now Pat. No. 8,085,452.

(60) Provisional application No. 60/899,391, filed on Feb. 5, 2007.

(51) Int. Cl.
*G03H 1/08* (2006.01)

(52) U.S. Cl. .................. 359/9; 359/21; 359/32; 359/35

(58) Field of Classification Search .................. None
See application file for complete search history.

(56) References Cited

U.S. PATENT DOCUMENTS

| | | | |
|---|---|---|---|
| 5,130,830 A | 7/1992 | Fukushima et al. | |
| 5,398,042 A | 3/1995 | Hughes | |
| 5,555,115 A | 9/1996 | Mitsuoka et al. | |
| 5,617,203 A | 4/1997 | Kobayashi et al. | |
| 5,912,758 A | 6/1999 | Knipe et al. | |
| 6,437,919 B1 | 8/2002 | Brown | |
| 6,654,156 B1 | 11/2003 | Crossland | |
| 6,930,693 B1 | 8/2005 | Coker | |
| 8,085,452 B2 * | 12/2011 | Stanley | ............... 359/9 |
| 2004/0196524 A1 | 10/2004 | Hughes et al. | |
| 2005/0286117 A1 | 12/2005 | Hughes et al. | |
| 2008/0204853 A1 | 8/2008 | Hughes et al. | |
| 2008/0211836 A1 | 9/2008 | Stanley et al. | |

FOREIGN PATENT DOCUMENTS

| | | |
|---|---|---|
| EP | 0525424 A2 | 2/1993 |
| GB | 2269238 A | 2/1994 |
| GB | 2330471 A | 4/1994 |
| GB | 2350962 A | 12/2000 |
| JP | 5027256 A | 2/1993 |
| WO | 9900993 | 1/1999 |
| WO | 99/19767 | 4/1999 |

(Continued)

OTHER PUBLICATIONS

Fukushima, S., et al., "Ferroelectric liquid-crystal spatial light modulator achieving bipolar image operation and cascadability", Applied Optics, Nov. 10, 1992, pp. 6859-6868, vol. 31, issue 32, Optical Society of America, United States of America.

(Continued)

*Primary Examiner* — Arnel C Lavarias
(74) *Attorney, Agent, or Firm* — Stolowitz Ford Cowger LLP

(57) ABSTRACT

A holographic imaging system includes an electrical addressable spatial light modulator (EASLM) and an optically addressable spatial light modulator (OASLM). A read light is configured to illuminate the OASLM, and a controller is configured to address the EASLM with both positive and negative sub-images and transmit the positive and negative sub-images to the OASLM. The controller is further configured to address the OASLM with an operating voltage, wherein the read light generates a holographic image comprised of diffraction patterns from the positive and negative sub-images.

15 Claims, 8 Drawing Sheets

FOREIGN PATENT DOCUMENTS

| | | |
|---|---|---|
| WO | 99/46768 | 9/1999 |
| WO | 00/38162 | 6/2000 |
| WO | 00/40018 | 7/2000 |

OTHER PUBLICATIONS

Perennes, F., and Crossland, W.A., "Optimization of ferroelectric liquid crystal optically addressed spatial light modulator performance", Opt. Eng., Aug. 1997, pp. 2294-2301, vol. 36, issue 8, Society of Photo-Optical Instrumentation Engineers, United States of America.

Yim, et al., "Comparison of operation parameters between binary and analogue switching pixellated light values", Optoelectronics IEEE Proc., Aug. 1998, pp. 236-242, vol. 145, issue 4, The Institution of Engineering and Technology, United Kingdom.

Fracasso, et al., "Recording reconfigurable binary computer-generated holograms on bistable optically addressed ferroelectric liquid-crystal spatial light modulators", Optics Letters, OSA, Optical Society of America, Washington, DC, US, vol. 15, No. 24, Dec. 15, 1990, pp. 1473-1475.

Banks, et al., "73.4: Real-Time Diffractive Video Projector Employing Ferroelectric LCOS SLM", SID 2006, 2006 SID International Symposium, Society for Information Display, LO, vol. XXXVII, May 24, 2005, pp. 2018-2021.

O'Brien, et al., "A holographically routed optical crossbar using a ferroelectric liquid-crystal over silicon spatial light modulator", Ferroelectrics, Overseas Publishers Associations, Amsterdam, NL, vol. 181, No. 1-04, Jul. 23, 1995, pp. 79-86.

Stolowitz, Ford, Cowger, LLP, Listing of Related Cases, Nov. 23, 2011, 2 pages.

* cited by examiner

HOLOGRAPHIC IMAGING SYSTEMS WITH DC BALANCE

This application is a continuation of U.S. patent application Ser. No. 12/026,492, filed Feb. 5, 2008, which claims priority to U.S. Provisional Application No. 60/899,391, filed on Feb. 5, 2007, the specifications of which are herein incorporated by reference.

FIELD OF USE

Holographic imaging systems comprising spatial light modulators configured to produce computer generated diffraction patterns or holograms either as a single frame or as a series of frames.

BACKGROUND

A re-configurable spatial light modulator (SLM) based on liquid crystal as well as other types of devices are widely used for controlling and manipulating optical beams. In diffractive mode they may be used for three dimensional (3D) imaging. 3D imaging is described further in U.S. Pat. No. 6,437,919 the specification of which is herein incorporated by reference.

The SLM modulates the complex amplitude of an incoming wave front (i.e. changes its phase and/or amplitude), which causes it to propagate in the desired manner. The SLM generally comprises a liquid crystal panel containing a number of individually addressed pixels, onto which a diffraction pattern or Computer Generated Hologram (CGH) is written.

CGH 3D display systems may use a computer to generate and/or store electronic copies of the hologram. This hologram is then replayed on an SLM which is switched to modulate (in transmission or reflection) light from a source which then passes through suitable replay optics, thereby providing a visible three-dimensional image to observers.

A single EASLM may be addressed to produce successive different images, which are imaged sequentially onto an OASLM arranged in a matrix of segments, which forms a complete display. Once all the component images have been written to the OASLM a complete image or pattern can be presented to an observer, e.g. by illumination of the whole OASLM matrix by laser light. This system may be referred to as Active Tiling™, and is described further in U.S. Pat. No. 6,437,919 and U.S. Pat. No. 6,654,156, the specifications of which are herein incorporated by reference.

The SLM system may include a layer of liquid crystal material arranged between two electrode-bearing walls to form a liquid crystal cell. The liquid crystal material is switched by application of electric waveforms to the electrodes. A characteristic of liquid crystal materials is that they deteriorate under the effects of long-term direct current (DC) voltages. The SLM system is designed so that the liquid crystal material is maintained under a net zero DC voltage and so that drive schemes for addressing the SLM system results in DC balance. A net zero voltage may be maintained over a reasonable time period of several seconds.

The EASLM may comprise a liquid crystal cell formed by two walls enclosing a layer of the smectic liquid crystal material. Transparent electrode structures are formed as strips of row electrodes on one wall and strips of column electrodes on the other wall. Electrode intersections define pixels where the optical state of the liquid crystal material is switched by application of an electric voltage to appropriate row and column electrodes. The electrodes receive electrical signals from driver circuits controlled by a display controller. The EASLM may use an integrated circuit backplane. A DC balance is achieved by addressing the SLM system to form a positive image followed by addressing the SLM system to form the inverse or negative image.

An OASLM is basically similar to the EASLM but may include a layer of photosensitive material located between electrodes on one wall and the ferroelectric liquid crystal material. The electrodes may be segmented so that electrical contact is made separately to each segment. An image may be applied to more than one segment (and in some cases to all of the segments) but a voltage is only applied to one segment to effect latching of the image only at that one segment. The OASLM is addressed by an application of a voltage to the electrodes and a simultaneous application of light to selected parts of the photosensitive material. This combination of applied voltage and applied light causes the liquid crystal material to switch at illuminated parts while non-illuminated parts remain unswitched. A display generated by the SLM system may be viewable from the side of the OASLM that is remote from the photosensitive layer.

Drive schemes may be used to provide DC balance are described further in "Optimisation of ferroelectric liquid crystal optically addressed spatial light modulator performance", F. Perennes & W. A. Crossland, Opt. Eng. 36 (8) 2294-2301 (August 1997); Applied Optics Vol. 31, No. 32, pp. 6859-6868, 10 Nov. 1992. The operating theory of spatial light modulators is described further in "Spatial Light Modulator Technology, Materials, Devices and Applications", edited by U. Efron, published by Marcel Dekker Inc. 1995.

In the SLM system described above, a pattern of light may be transmitted through or reflected from the EASLM, on to each segment of the OASLM in turn. Alternatively, the several images may be applied to all segments of the OASLM. For each time period in which an image is loaded into the EASLM, played onto the OASLM, and latched into the OASLM, there follows an equal time period in which an inverted image is loaded into the EASLM and held in order to maintain DC balance at the EASLM. This time period is wasted from the point of view of the OASLM device. It does not contribute to improving the OASLM image.

BRIEF DESCRIPTION OF THE DRAWINGS

The various embodiments will now be described, by way of example only, with reference to the following drawings in which.

DETAILED DESCRIPTION

Figure 1:
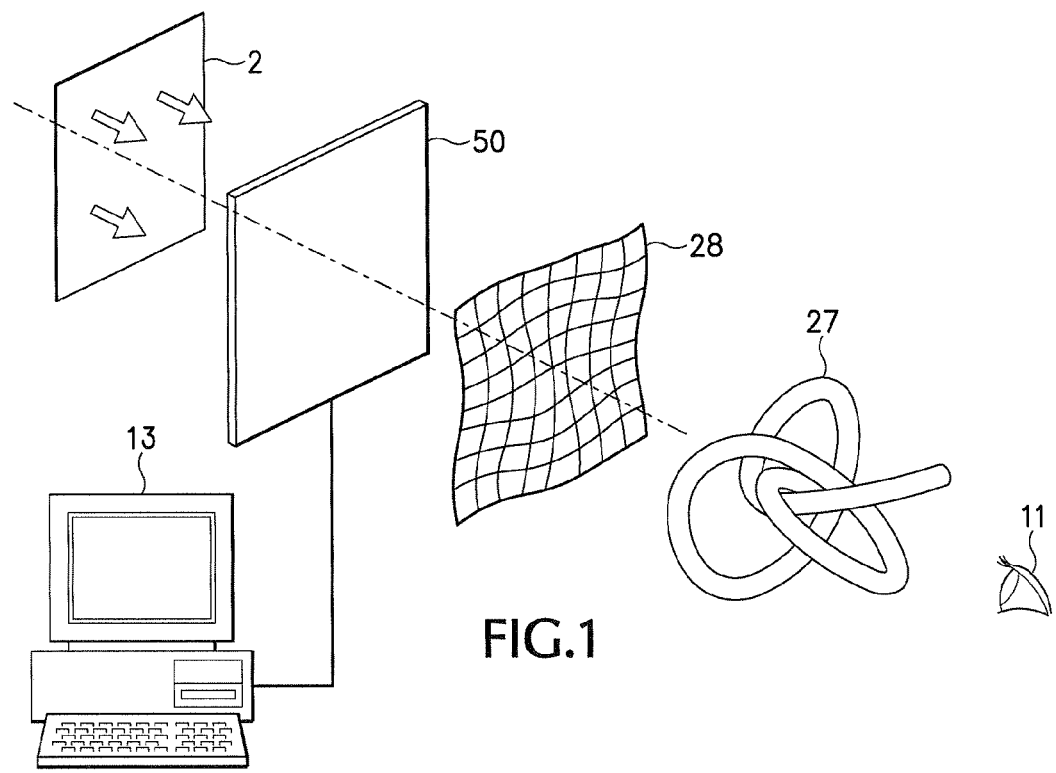
FIG. 1 shows the basic principles of computer generated holographic (CGH) imaging.

FIG. 1 shows the principles of holographic imaging with a spatial light modulator (SLM). A two-dimensional input wavefront 2 has its planar form modified in phase and amplitude by a spatial light modulator 50 to provide an output wavefront (a diffraction pattern) 28 that is displayed or seen by an observer 11 as a three dimensional or holographic image 27. The SLM 50 is controlled by a computer or controller 13 which generates, or outputs, a previously stored computer generated hologram (CGH). The SLM 50 may comprise an optically addressable spatial light modulator (OASLM) and an electronically addressable spatial light modulator (EASLM).

Figure 2:
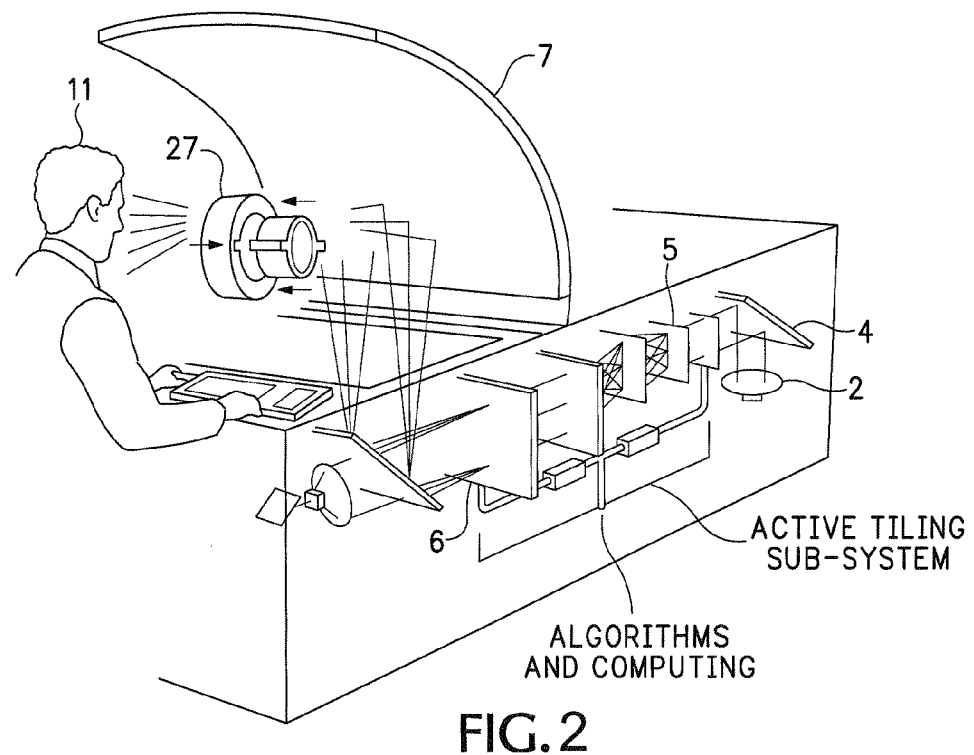
FIG. 2 shows an arrangement for viewing CGH images using an electrically addressed spatial light modulator (EASLM) and an optically addressed spatial light modulator (OASLM)

FIG. 2 shows a stylized perspective view of a holographic imaging system using a spatial light modulator, such as the spatial light modulator of FIG. 1. Light 2 is directed from an EASLM 4 through replication optics 5 onto an OASLM 6, then imaged via Fourier and magnification optics 7 to be displayed or appear as a holographic image 27 in front of an observer 11.

Figure 3:
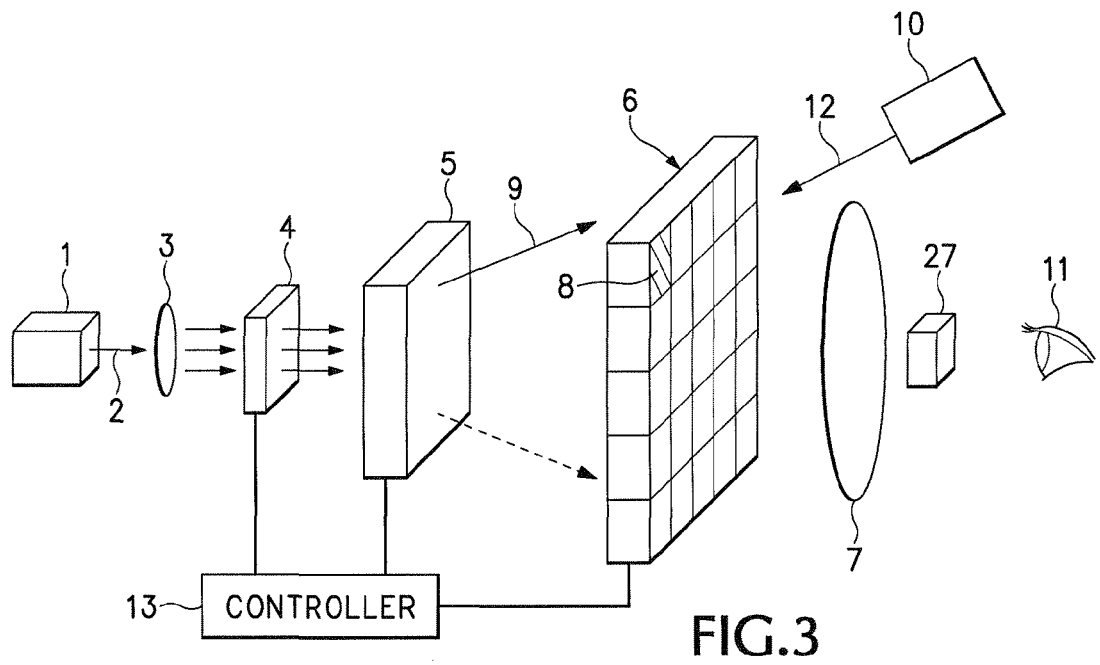
FIG. 3 shows schematically a system having a single EASLM imaged onto a large OASLM forming an Active Tiling™ display system.

FIG. 3 shows schematically a system having a single EASLM imaged onto an OASLM. The system may be referred to as Active Tiling™ and is described in more detail in U.S. Pat. No. 6,437,919, the specification of which is incorporated by reference. The SLM system may be used for large area two-dimensional displays, or for three dimensional holographic image displays. A holographic display may also be referred to as a computer generated hologram (CGH).

The SLM system shown in FIG. 3 may be used to generate a reconfigurable holographic display. The SLM system comprises a light source 1 whose output 2 may be directed through a lens 3 onto the EASLM 4. This EASLM 4 may be a liquid crystal modulator in which a layer of smectic liquid crystal material is held between two glass walls. Column electrodes on one wall and row or line electrodes on the other wall form a matrix of addressable elements or pixels at electrode intersections. When a voltage is applied to a pixel, the liquid crystal material rotates under the applied electric field to modulate light transmission. The EASLM may use active matrix addressing to obtain high switching speeds. The EASLM may comprise smectic, nematic, or cholesteric material as well as silicon active backplane devices or micro mirror devices.

In front of the EASLM 4 are a replication optical arrangement 5, an OASLM 6, and a Fourier lens 7.

Figure 4:
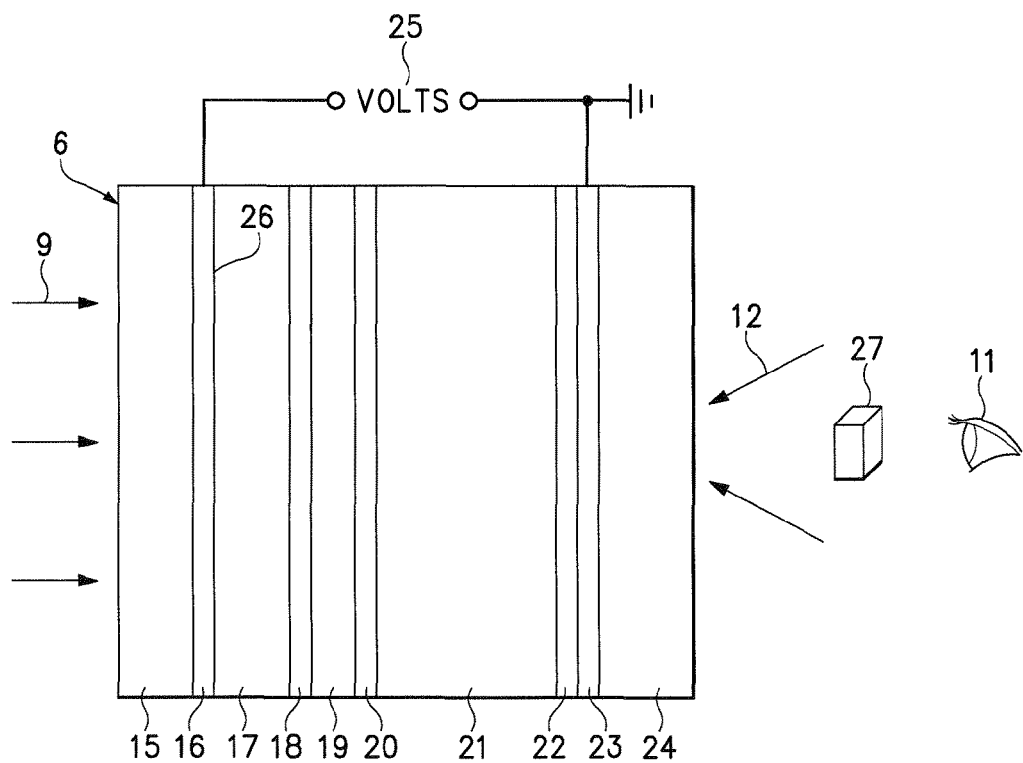
FIG. 4 shows schematically a cross section of the OASLM of the system of FIG. 3.

FIG. 4 shows schematically a cross section of the OASLM 6 of the system of FIG. 3, illustrating the structure of the OASLM 6. The OASLM 6 comprises a first glass layer 15, an indium tin oxide layer 16 which forms a first transparent electrode, a silicon photosensor layer 17, a light blocking layer 18, a mirror 19, and a first alignment layer 20 which may be formed by brushing a polyimide layer. The OASLM 6 may further comprise a liquid crystal (LC) layer 21, a second alignment layer 22, a second indium tin oxide electrode layer 23 which may be connected to earth, and a second glass layer 24. A voltage source 25 is coupled to the two electrodes 16, 23 in order to control the switching of the OASLM 6.

The liquid crystal material may be comprised of a ferro-electric liquid crystal material formed into a bistable device. This device switches between two stable states, which may be termed an OFF state and an ON state, on receipt of a unipolar pulse of suitable amplitude and time. A positive voltage pulse may cause a switching to say an OFF state, and a negative pulse switching to an ON state (or vice versa).

The junction between the silicon 17 and electrode layer 16 acts as a diode 26. When a voltage of a first positive polarity is applied between the electrodes this diode 26 is forward biased and most of the voltage will be dropped across the LC layer 21. When a voltage of a second, negative polarity is applied to the electrodes, most of the voltage will be dropped across the silicon layer 17 unless write light 9 is applied in which case the voltage will be dropped across the LC layer 21. The bias of the second polarity may be referred to as the "photosensitive direction". Thus the OASLM 6 can be switched to OFF by a suitably large blanking pulse and selectively switched to ON by the combination of an addressing voltage pulse and light from the EASLM 4.

The OASLM 6 comprises multiple separate segments 8, each of which may be independently addressable. Whereas the OASLM 6 is illustrated as comprising twenty five segments arranged in a 5×5 matrix, other size matrixes having different numbers of independently addressable separate segments can be formed.

Figure 5:
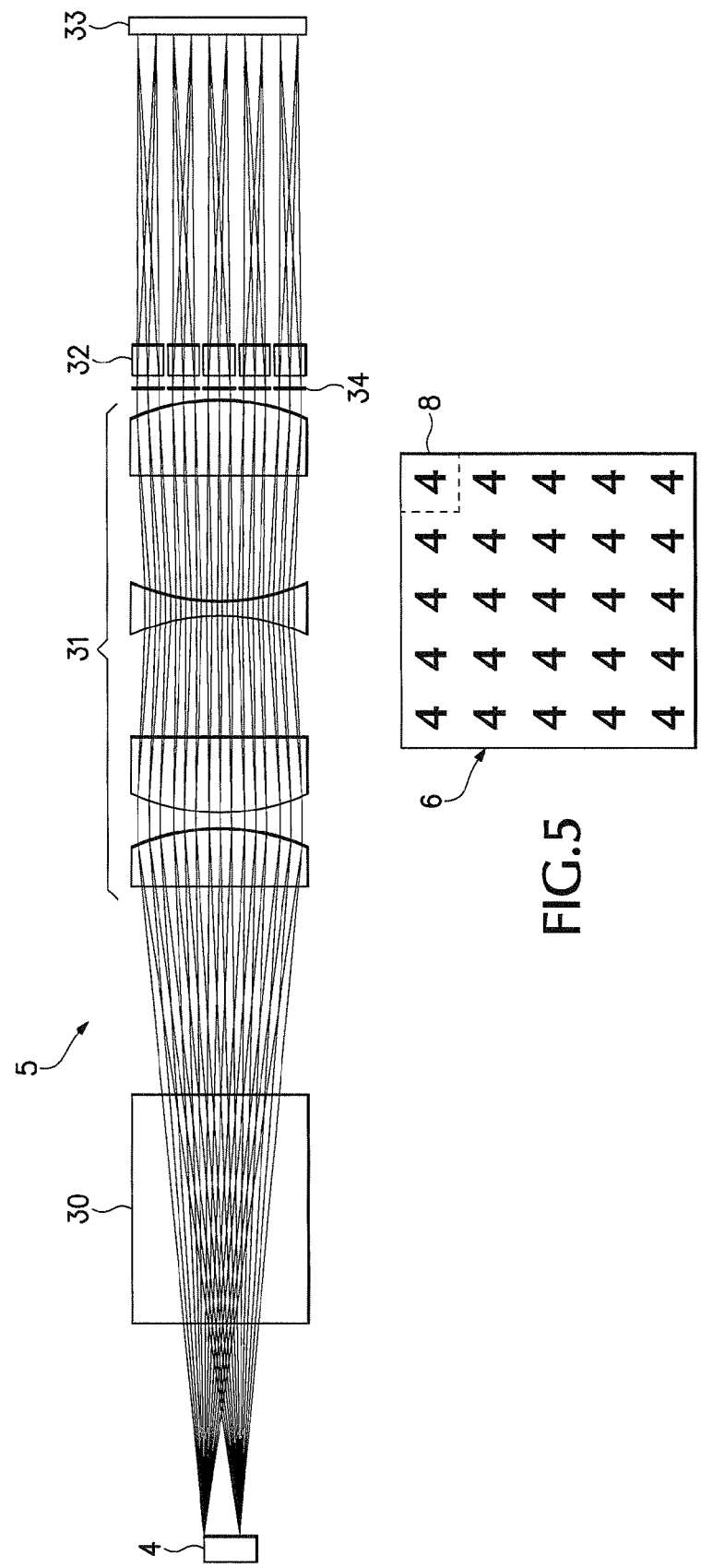
FIG. 5 show an expanded view of replication optics forming a part of FIG. 3.

FIG. 5 shows a replication optical arrangement 5 comprising a beam splitter 30, an arrangement of front collimation optics 31, and lens array 32. The replication optics 5 may be configured to take a single image from the EASLM 4 and expand it to form a matrix of identical images 33 illustrated as a 5×5 array on the OASLM 6. A shutter array 34 may be used for some embodiments and allows a single image (out of the matrix of images) to illuminate a single segment 8 of the OASLM 6, one segment at a time.

As previously described, the OASLM 6 may be configured as a 5×5 array with addressing segmental electrodes 16, 23. Light may cause a switching within the liquid crystal 21 of the OASLM only when write voltages are applied to electrodes 16, 23. In one embodiment, the total output from the replication optics 5 can be imaged onto all segments 1-25 of the OASLM 6, but only the segment 8 receiving a write voltage will switch.

Light 9 from the EASLM 4 modulates the liquid crystal layer 21 thereby modifying its reflective (or transmissive) properties when illuminated by a read-light source 10. Accordingly, a large display comprised of many separate sub-images can be formed on the OASLM 6. Images may be observed either by reflection of light 12 from or by transmission of light through the OASLM 6. Thus a pattern of light from the EASLM 4 may be displayed on or transmitted from the OASLM 6 to an observer 11.

In one embodiment, the OASLM 6 may be formed with a single continuous sheet electrode on each cell wall. A shutter may be provided to ensure that light from the EASLM 4 is only received by one segment area of the OASLM 6 at any given time. In another embodiment, the OASLM 6 is formed of several separate optically addressable spatial light modulators placed together to form a large display.

The computer or controller 13 controls the signals applied to the EASLM 4 and OASLM 6. The controller 13 may contain electronic copies of images to be displayed. A further description of EASLMs and OASLMs used with holographic displays is provided in European patent application number 1064651.

In one embodiment, the OASLM is formed by a 1.7 μm thick layer of a ferro-electric smectic liquid crystal material comprised of a 50:50 mixture of chiral SCE8 and its racemic equivalent SCE8R (obtainable from CLARIANT, GmbH), in a cell with DI-32 rubbed polymer (DURIMIDE 32 obtainable from ARCH SEMICONDUCTOR CHEMICALS NV Belgium) alignment, with a photo sensitive layer of MVS (MV Systems Inc, Golden, Denver, Colo.) silicon ~1.5 μm thick.

Operation

For each segment 8, a blanking pulse may be applied to electrodes 16, 23 causing all areas of liquid crystal material 21 to switch to or remain in one of two bistable states, for example an OFF state.

A positive sub-image may be formed on the EASLM 4 and projected onto the OASLM 6. The combination of a light pattern on the input face of the OASLM 6 and the application of a voltage to a segment electrode, causes liquid crystal molecules 21 to switch to an ON state where light is received, elsewhere the molecules remain in an OFF state. The pattern of ON areas and OFF areas forms a diffraction pattern that passes through the Fourier lens 7 to be displayed or seen by an observer 11 as a holographic image 27.

The above operation may be repeated using a negative sub-image generated on the EASLM 4. All areas on the segment may start in the blanked OFF state, wherein areas that receive light switch to the ON state and those not illuminated remain in the OFF state. This forms a diffraction pattern that may be displayed or seen by the observer 11 as the same holographic image 27 received when the previous positive image was projected onto the OASLM 6. Both positive and negative images may provide the same diffraction pattern for observation as a holographic image 27.

The liquid crystal material 21 may receive two blanking pulses; an electrical pulse representing light from the positive image in some areas, and an electrical pulse representing light from the negative image in the remaining areas. Each blanking pulse voltage time product (v.t) may be arranged to equal half the voltage time product of the light induced values so that the material has received a zero v.t product and is DC balanced.

FIGS. 6 to 9 are timing diagrams for different embodiments comprising an EASLM 4 and an OASLM 6, and writing and reading lights. The timing diagrams illustrate the various actions taking place, including EASLM actions, light projecting EASLM display onto the input of the OASLM, voltage applied to the OASLM segment electrodes, and read light applied to the output of the OASLM.

Associated activity at the EASLM 4, the OASLM 6 and the read light is plotted against time, corresponding with a first segment S1, second segment S2, and an nth segment S25. The number of segments (n) corresponds to the number of segments in an OASLM matrix, which in one example is illustrated by a five by five matrix comprising 25 segments. Each segment may be understood as comprising one or more time periods T of activity within which a blanking pulse, read light, or write light may be applied.

Figure 6:
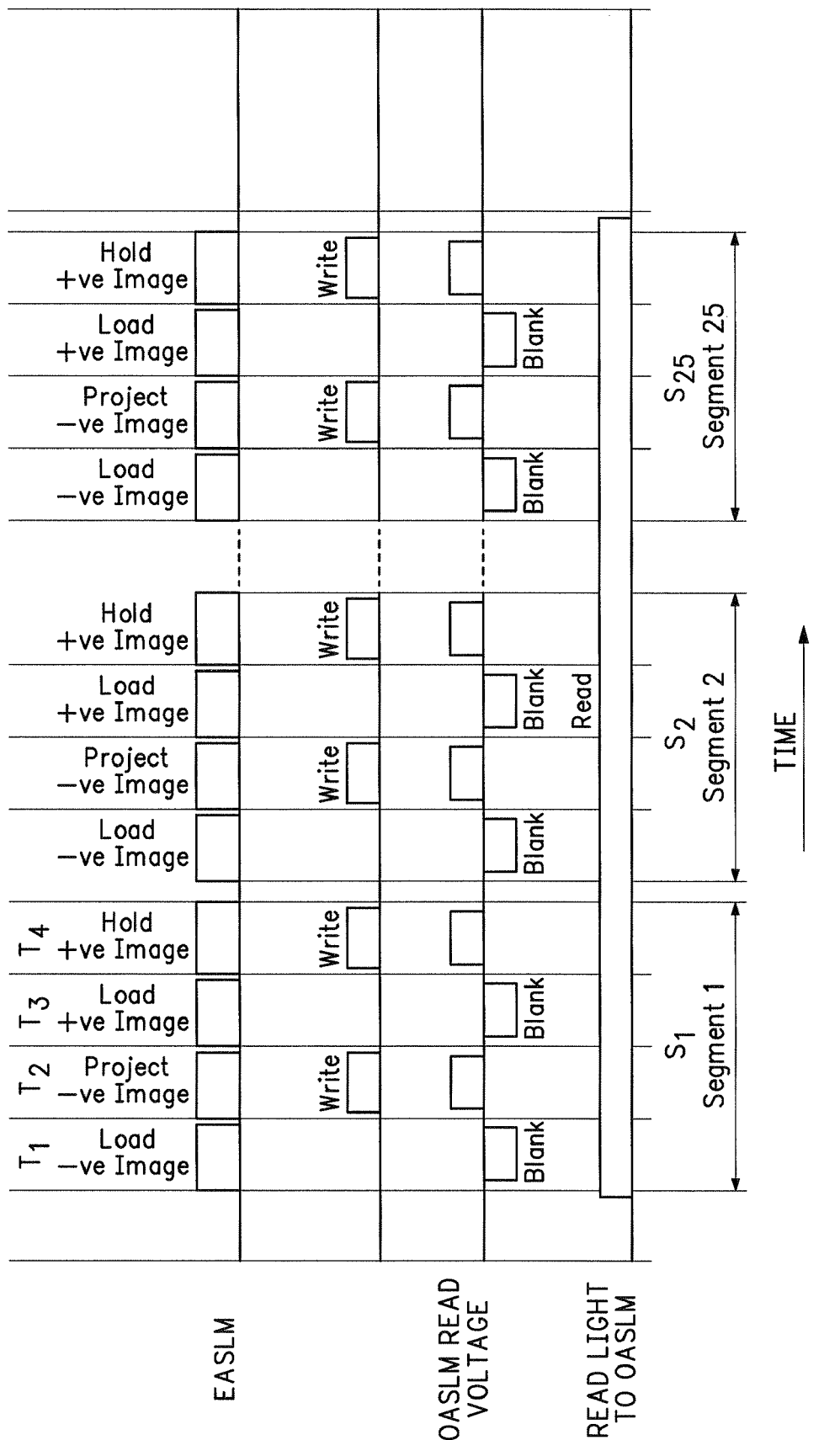
FIGS. 6 to 9 are timing diagrams for different embodiments comprising an EASLM and an OASLM, and writing and reading lights.

With reference to FIG. 6, a negative sub-image is loaded into the EASLM 4 by the controller 13 during a first time period T1. During this time a blanking pulse (BLANK) is applied to the electrodes 16, 23 of segment 1 which causes the liquid crystal material 21 over the whole area of segment 1 to switch and latch to an OFF state. At the same time the read light 10 is switched ON and remains ON for the whole addressing cycle.

In the next time period T2, the sub-negative image is held in the EASLM 4 and projected towards the OASLM 6 by operation of a write laser 1 pulse (WRITE). At the same time a read light 10 voltage pulse is applied to a segment S1 electrode, resulting in the OASLM 6 segment S1 storing a copy of the negative sub-image held in the EASLM 4.

In the next time period T3 a positive image is loaded into the EASLM 4 from the computer 13. During this time a blanking pulse is applied to the electrodes of segment S1 which causes the liquid crystal material over the whole area of segment S1 to switch and latch to an OFF state.

In the next time period T4, the positive sub-image is held in the EASLM 4 and projected towards the OASLM 6 by operation of a write laser pulse. At the same time a read voltage pulse is applied to a segment S1 electrode, resulting in the OASLM segment S1 storing a copy of the positive sub-image held in the EASLM 4.

This completes the addressing of segment S1. The above steps may be repeated for segments S2 to S25. Throughout the addressing of segments S1 to S25, the read light 10 remains on and an observer 11 is able to see a holographic image 27.

Figure 7:
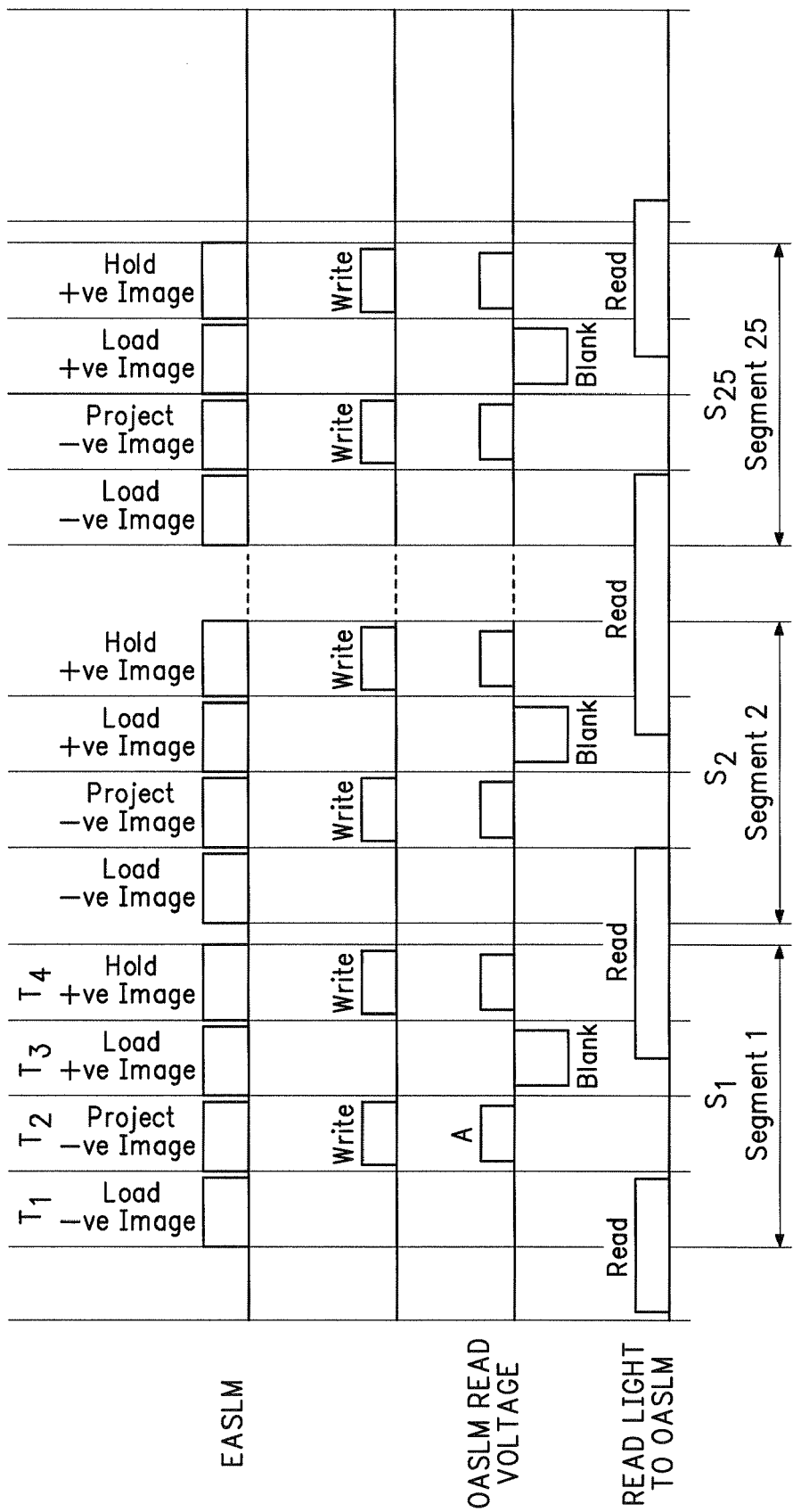

FIG. 7 is a variation of the method illustrated in FIG. 6. As before, negative sub-images are loaded into the EASLM 4 and held while the sub-image is projected towards the OASLM 6 with a write pulse (WRITE). A positive sub-image is loaded into the EASLM, and projected towards the OASLM with a write pulse. FIG. 7 differs in using a single large blank pulse (BLANK) applied to an OASLM segment whilst the positive sub-image is being loaded into the EASLM (e.g. at time period T3).

As a result of the single blank pulse, the sub-image written into an OASLM segment before the blank pulse (e.g. at time period T2) is a mixture of a previously written positive sub-image and the new negative sub-image. Such a resultant sub-image may generate noise and dangerous diffraction of readout lasers. Consequently the readout light (READ) may be turned off for a period during the first data load for each segment (e.g. at time period T2). After the blanking pulse, the OASLM segment receives a true copy of the positive EASLM image. This operation may be repeated for all n segments. The method illustrated by FIG. 7 may be used for displaying a moving image where successive holographic images move in space.

Figure 8:
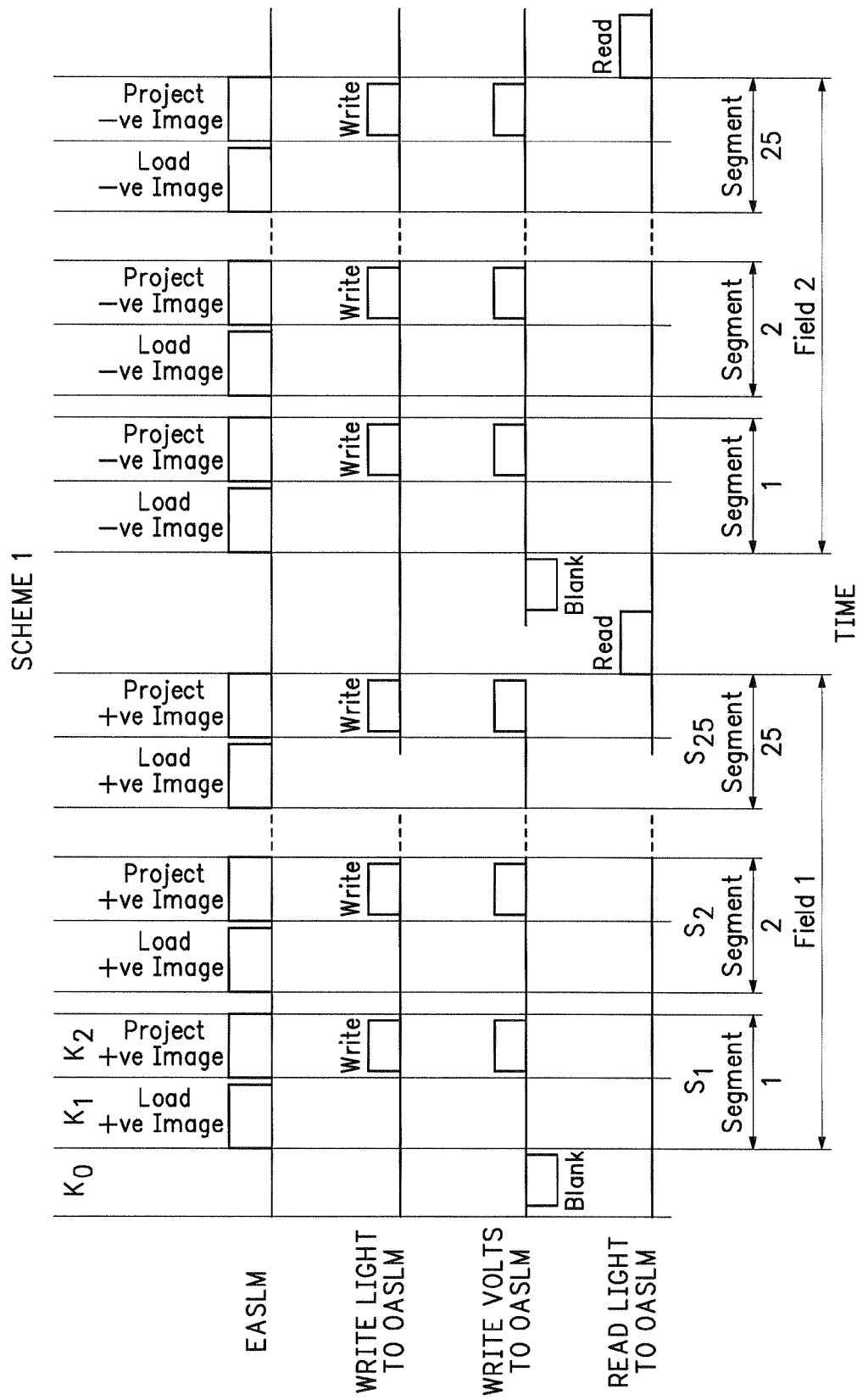

FIG. 8 illustrates an embodiment where all segments 8 of the OASLM 6 are blanked to OFF (e.g. at time period K0). A succession of positive sub-images are loaded into the EASLM 4 (e.g. at time period K1) and written into each segment of the OASLM (e.g. at time period K2). After all n positive sub-images have been written into the OASLM in a first time-field (field 1), the read light 10 is applied and the diffraction pattern 27 observed. Following this, all segments of the OASLM are blanked to OFF, and a succession of negative sub-images are similarly loaded into the EASLM and OASLM segments followed by application of the read light 10.

Figure 9:
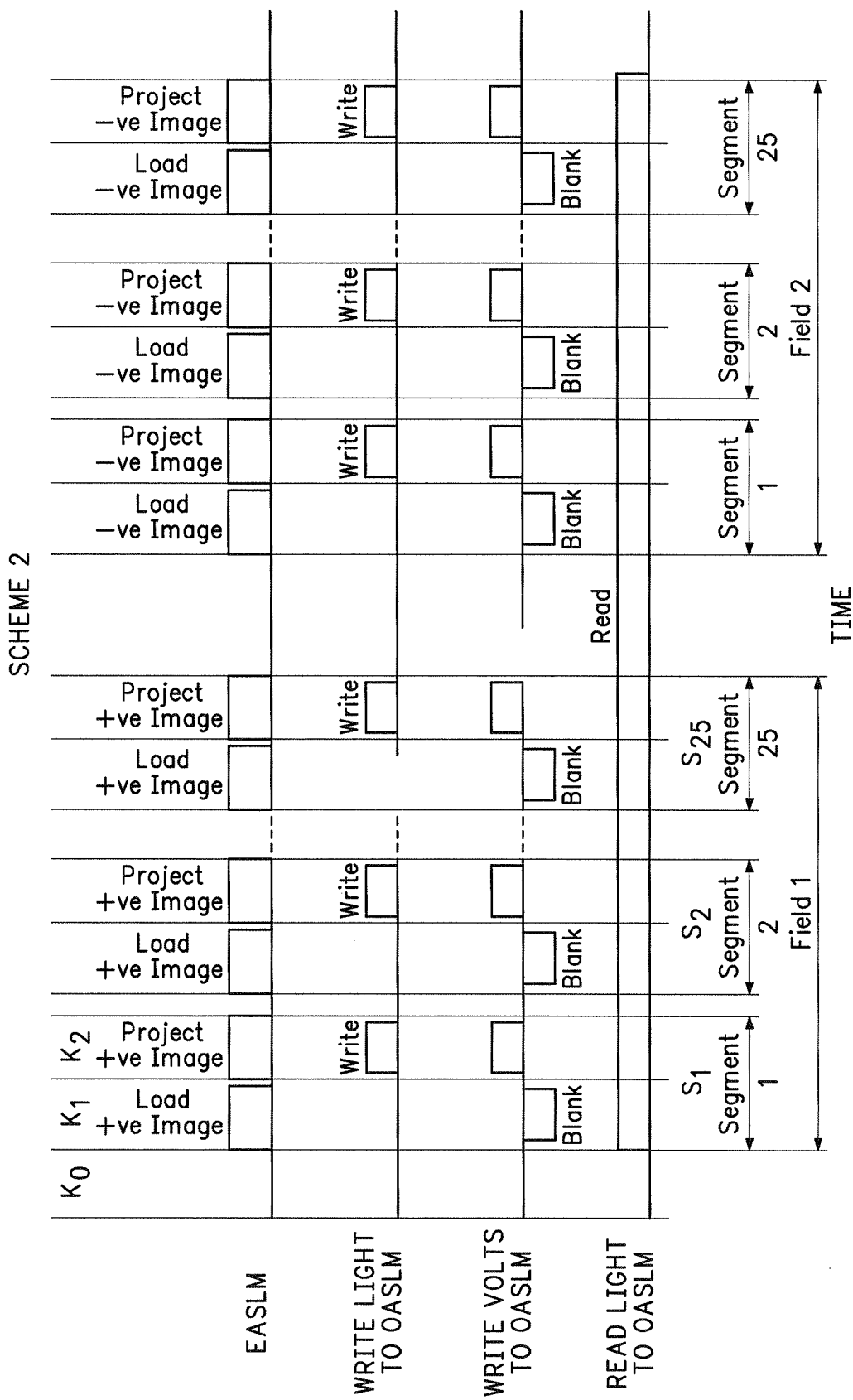

FIG. 9 is a variation on the embodiment illustrated in FIG. 8 in which each segment of the OASLM is blanked individually while the positive sub-image is being loaded into the EASLM (e.g. at time period K1). In the next time period (e.g. at time period K2) the EASLM sub-image is projected towards the OASLM segment and that segments electrodes receive an addressing pulse. This is repeated with a positive sub-image read into each segment in turn until all n (e.g. 25) segments in field 1 have been addressed with the positive sub-images.

The above operation may also be repeated for negative sub-images until all n (e.g. 25) segments in field 2 have been addressed with negative sub-images. In one embodiment, the read light remains ON for the whole of the positive and negative addressing times (field 1 and field 2).

In FIGS. 6-9 the blanking pulses (both global and segmental) are shown as a single unipolar pulse. The blanking may also be bipolar with appropriate amplitude levels to ensure DC balance. Also the OASLM write pulses, shown as unipolar pulses, may be replaced with bipolar pulses.

Figure 10:
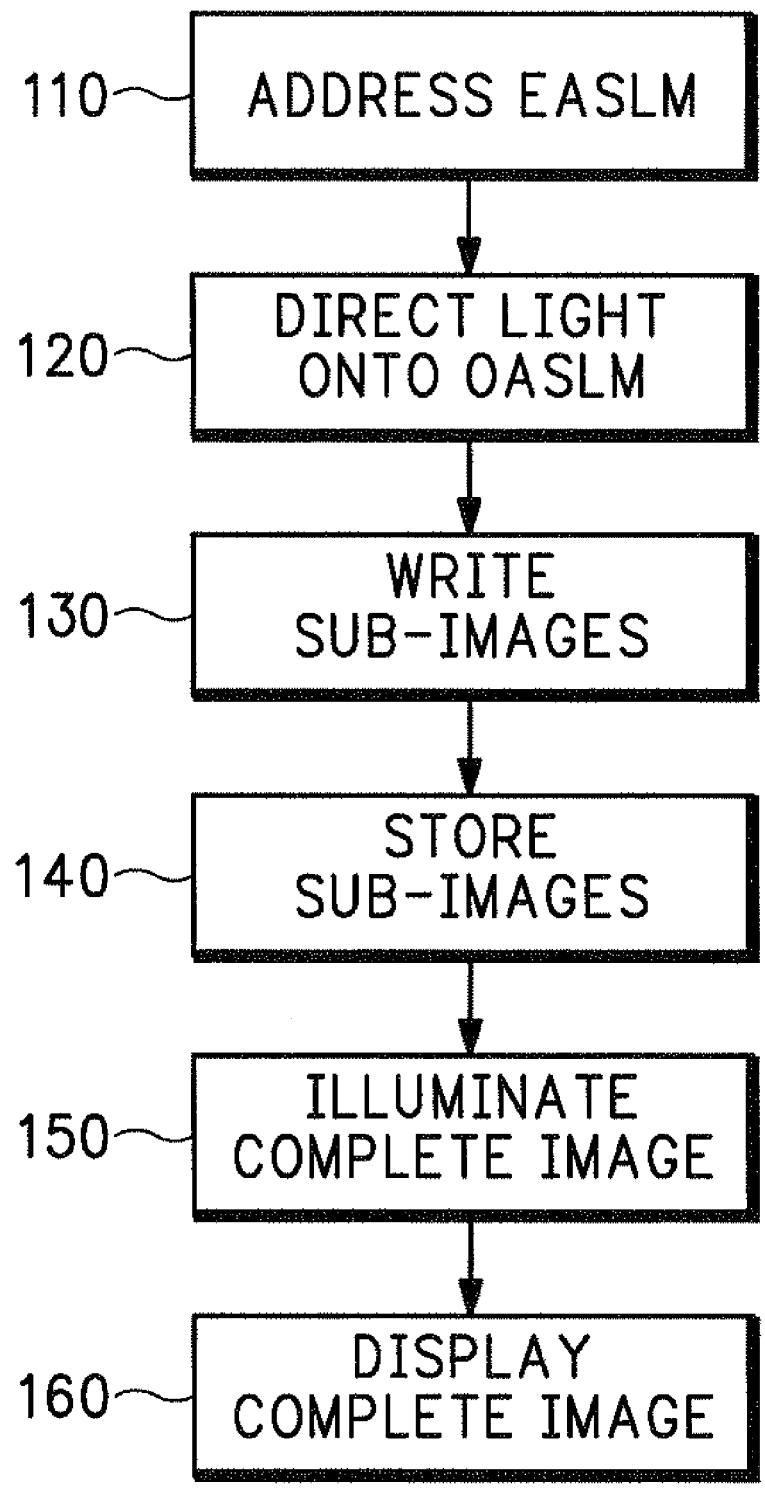
FIG. 10 illustrates an example method of addressing a holographic imaging system.

FIG. 10 illustrates an example method of addressing a holographic imaging system.

At operation 110, an EASLM is addressed to form a succession of both positive and negative sub-images.

At operation 120, a write light is directed onto the EASLM and then onto an OASLM. At operation 130, sub-images are sequentially written onto different areas of the OASLM.

At operation 140, a plurality of sub-images are stored on the OASLM to form a complete diffraction pattern from a plurality of positive sub-images and a complete diffraction pattern from a plurality of negative sub-images.

At operation 150, the complete image is illuminated on the OASLM.

At operation 160, the light is directed through optics to display the complete image. The optics may include a Fourier lens configured to make the image viewable by an observer.

In one embodiment, a diffraction pattern holographic image is displayed or presented to an observer, wherein a DC balance is maintained. The positive and negative sub-images may be read into the OASLM as alternate positive and negative sub-images, or as all positive followed by all negative sub-images or in any combination thereof.

The EASLM may be addressed with both positive and negative images or patterns (to give DC balance), which are then imaged onto an input face of one or more OASLMs. The diffraction patterns may be read out from the OASLM output corresponding to both positive and negative image inputs. The diffraction patterns form the holographic image.

In one embodiment, a holographic imaging system comprises an EASLM an OASLM, and a write light arranged to illuminate the EASLM and transmit light via light replicating optics onto the OASLM. The system may further comprise a read light for illuminating the OASLM, a controller for addressing the EASLM with both positive and negative images, and optics for enabling the holographic image to be displayed or observed from the OASLM when illuminated by the read light. The controller may be configured to control voltages on the OASLM, and control the write and read lights. The optics may include a Fourier lens.

In one embodiment, a holographic imaging system comprises means for controlling the EASLM to display both positive and negative images separately, and means for addressing the OASLM with voltages and both positive and negative images, wherein the diffraction patterns from both positive and negative images can be displayed or projected to an observer with substantially DC balance at the OASLM. The OASLM may be a single large cell with segmented electrodes whereby a voltage may be applied independently to any one area of the liquid crystal material between opposing segment electrodes so that each segment may be addressed separately.

The light replicating optics may include a beam splitter and optics for forming a matrix of identical images from a single image at the EASLM and imaging this matrix onto the whole OASLM. In one embodiment, the light replicating optics include shutters which allow just one of these identical images to be imaged on a part of the OASLM. In yet another embodiment, the light replicating optics include shutters and lenses for scanning sub-images from the EASLM to each segment of the OASLM in a sequence.

The system may write alternative positive and negative images on to each segment in turn until all the OASLM has been addressed, after which the read light may be applied. In one embodiment, all the positive sub-images may be imaged onto all segments of the OASLM to form a complete image, and the read light is continuously applied while all negative sub-images are generated by the EASLM and applied to the OASLM. The read light may be applied after the whole OASLM has been addressed, or after each segment has been addressed, by application of positive and/or negative sub-images, or combinations thereof.

The system described above can use dedicated processor systems, micro controllers, programmable logic devices, or microprocessors that perform some or all of the operations.

Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles in a preferred embodiment thereof, it should be apparent that the embodiments may be modified in arrangement and detail without departing from such principles. We claim all modifications and variation coming within the spirit and scope of the following claims.

The invention claimed is:

1. A method comprising:
    addressing an electrically addressable spatial light modulator (EASLM) to form a succession of both positive and negative holographic sub-images, wherein the positive and negative holographic sub-images provide for a direct current (DC) balance of the EASLM;
    transmitting the positive and negative holographic sub-images to an optically addressable spatial light modulator (OASLM);
    writing the positive and negative holographic sub-images onto a plurality of segments of the OASLM;
    providing a blanking pulse to the plurality of segments in between writing the positive and negative holographic sub-images; and
    generating a holographic image comprising the positive and negative holographic sub-images.

2. The method of claim 1, further comprising illuminating the OASLM with a read light while applying the blanking pulse.

3. The method of claim 2, wherein the OASLM is illuminated while the EASLM is being addressed with one or more of the negative holographic sub-images.

4. The method of claim 1, wherein the blanking pulse is provided to the OASLM while the EASLM is being addressed with one or more of the positive holographic sub-images.

5. The method of claim 1, further comprising illuminating the OASLM with a read light while writing the positive and negative holographic sub-images to the OASLM.

6. The method of claim 1, wherein a series of the positive holographic sub-images are written onto the OASLM separately from a series of the negative holographic sub-images.

7. The method of claim 1, wherein the plurality of segments are arranged in an array, and wherein the blanking pulse is applied to the plurality of segments at the same time.

8. A system comprising:
    an electrically addressable spatial light modulator (EASLM);
    a write light configured to illuminate the EASLM;
    an optically addressable spatial light modulator (OASLM);
    a read light configured to illuminate the OASLM; and
    a controller configured to:
        address the EASLM to form a succession of both positive and negative holographic sub-images, wherein the positive and negative holographic sub-images provide for a direct current (DC) balance of the EASLM;

transmit the positive and negative holographic sub-images to the OASLM;
write the positive and negative holographic sub-images onto a plurality of segments of the OASLM;
provide a blanking pulse to the plurality of segments in between writing the positive and negative holographic sub-images; and
generate a holographic image comprising the positive and negative holographic sub-images.

9. The system of claim 8, wherein the controller is further configured to illuminate the OASLM with a read light while the positive and negative holographic sub-images are written to the OASLM.

10. The system of claim 9, wherein the controller is further configured to illuminate the OASLM with a read light while the positive and negative holographic sub-images are being transmitted to the OASLM.

11. The system of claim 8, wherein the positive and negative holographic sub-images are written onto the OASLM as a series of alternating positive and negative holographic sub-images.

12. The system of claim 8, wherein the blanking pulse is provided to the plurality of segments, one segment at a time.

13. The system of claim 8, wherein the positive and negative holographic sub-images are written to individual segments of the OASLM as image pairs, and wherein the controller is further configured to provide a single blanking pulse for each image pair written to the individual segments of the OASLM.

14. The system of claim 8, wherein the controller is further configured to:
illuminate the OASLM with a read light after writing the positive and negative holographic sub-images; and
deactivate the read light while the positive and negative series of holographic sub-images are being written.

15. The system of claim 14, wherein the OASLM is twice illuminated with the read light to generate the holographic image.

* * * * *

UNITED STATES PATENT AND TRADEMARK OFFICE
CERTIFICATE OF CORRECTION

PATENT NO.         : 8,411,339 B2
APPLICATION NO.    : 13/303514
DATED              : April 2, 2013
INVENTOR(S)        : Stanley Page 1 of 1

It is certified that error appears in the above-identified patent and that said Letters Patent is hereby corrected as shown below:

In the Specifications:

In Column 2, Line 56, delete "show" and insert -- shows --, therefor.

In Column 4, Line 60, delete "Inc," and insert -- Inc., --, therefor.

In Column 7, Line 22, delete "an EASLM an OASLM," and insert -- an EASLM and an OASLM, --, therefor.

Signed and Sealed this
Twentieth Day of August, 2013

Teresa Stanek Rea
*Acting Director of the United States Patent and Trademark Office*